Jan. 31, 1956   R. A. RUSSO   2,733,148
METHOD OF FORMING MOZZARELLA CHEESE
Filed Aug. 16, 1952
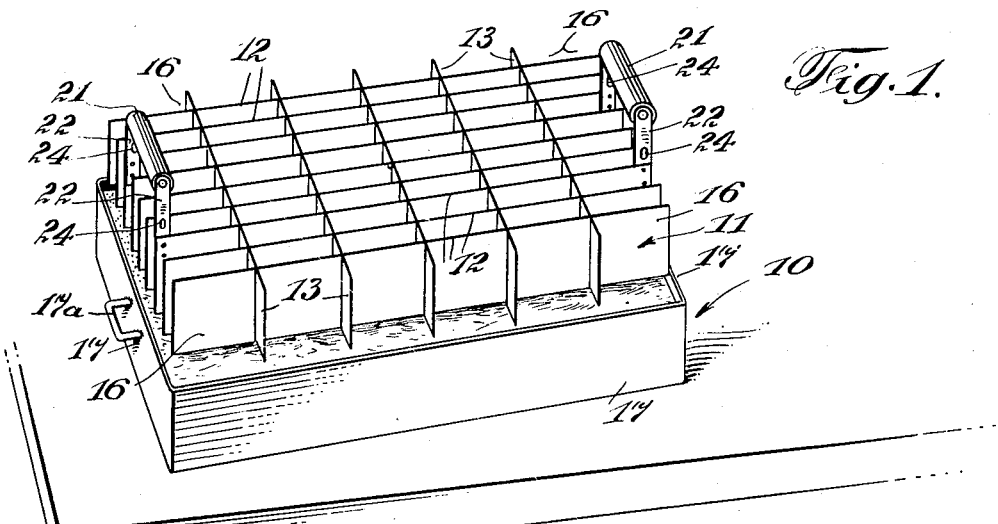
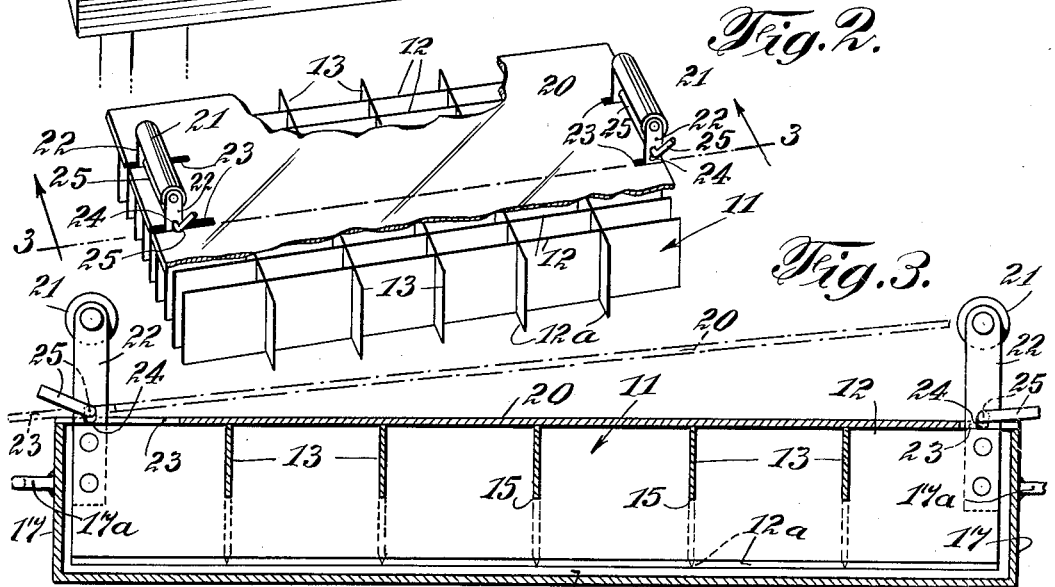
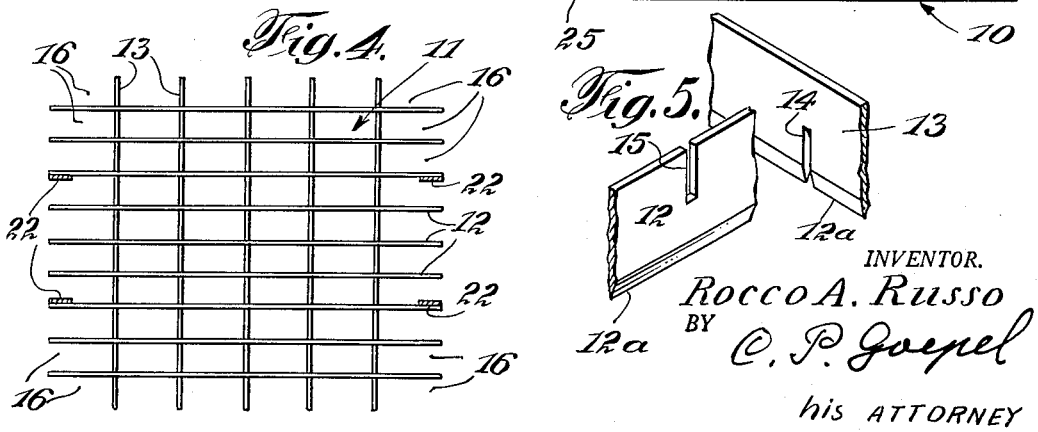
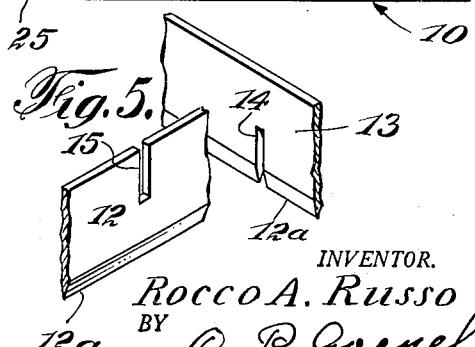
INVENTOR.
Rocco A. Russo
BY
C. P. Goepel
his ATTORNEY

2,733,148
METHOD OF FORMING MOZZARELLA CHEESE

Rocco A. Russo, Astoria, N. Y.

Application August 16, 1952, Serial No. 304,726

3 Claims. (Cl. 99—116)

This invention relates to a method of forming cheese, and the object of this invention is to provide a method of forming the heavier type of cheese, which is now sold on the market in irregular shapes, so that merchandizing is facilitated by the regularity of shapes with the corresponding regularity of labelling.

For the practice of my novel method, I provide a container for holding the plastic cheese, and a former of a multiplicity of cutting knives consisting of plates with cutting edges, spaced longitudinally and laterally apart to form spaces corresponding to the desired size in length and width of the plastic cheese to be cut, the height of the same being determined by the depth of the container and the length of the cutting knives. The former is provided with supporting handles to enable the cutter to be moved into the container and into the plastic cheese therein by the application of pressure applied to the handles which pressure is distributed over all of the cutting edges of the knives. A top plate closes the spaces at their upper ends to exert a molding action on the plastic cheese.

A further object of the invention is to provide a novel method for producing Mozzarella cheese and for merchandizing the same.

The invention will be further described, an embodiment shown in the drawings, and the invention will be finally pointed out in the claims.

In the accompanying drawings,

Fig. 1 is a perspective of the container holding the plastic cheese, and the former spaced therefrom just before inserting the knives into the plastic cheese;

Fig. 2 is a perspective view of the former with part of the covering plate removed;

Fig. 3 is a section of a part of the former and container;

Fig. 4 is a plan view of the cutter, and

Fig. 5 is a detail perspective view of two spaced apart cutters.

Similar characters of reference indicate corresponding parts throughout the views.

Referring to the drawings, the container 10 is almost filled with plastic cheese. Then, the former 11 is pressed down into the cheese. The former 11 consists of a plurality of longitudinal plates 12, crossed by transverse plates 13. Each of these plates have slits therein so that one plate enters the slit 14 which extends one half of the depth of the other plate, and the other plate enters the slit 15 which extends one half of the depth of the first plate. These plates, however, may be joined in any other suitable way, the essential being to space the plates in respect to each other so that they form a space the size of the cheese intended to be cut and then wrapped. The outer surfaces 16 of the plates form enclosed spaces with the surrounding wall 17 of the container 10. The container 10 has handles 17a for ready handling of the container. The lowermost edges of the plates are all in one plane, and are preferably provided with knife edges, or the like, to assist in the cutting action on the cheese.

The upper edges of the plates are also in one plane, and a plate 20 is placed thereon closing all of the upper portions of the spaces. In certain cases, this plate 20 acts to press any cheese which would otherwise extend above the plane of the upper edges of the cutter, tightly into the spaces, so as to make a completely surrounded space and thereby produce an evenly compacted separate cube or block of cheese.

A handle 21 is preferably applied to each longitudinal end of the cutter, so that the rather heavy cutter may be transported from place to place, and more particularly to enable pressure to be applied to the cutter for the downward movement of the knife plates. The handles may be applied along a transverse line of the cutter, if desired.

In the drawings, sixty cubes are shown, but satisfactory results have been obtained with thirty cubes. The number of cubes, above a certain number, is not essential.

The handles 21 have uprights 22 which are narrow to enter slots 23 of the plate 20. Uprights 22 have oblong holes 24 in alignment, into which removable L-shaped rods 25 enter. These rods hold the plate 20 tightly against the walls 17, to limit the upward movement of the knife edges 12a so as to leave a predetermined uncut layer 25 of cheese. The plate 20 can be used as a pressure member, and when the plate 20 abuts against the walls 13, the limit of entrance of the knife edges 12a into the cheese is thereby determined.

One operation is to press the cutters into the cheese the greater amount of the depth of the cheese and then apply the plate for the facial pressure. The plate 20 serves also to mold the tops of the cheese cut outs.

Without limiting the invention to dimensions, but to enable the invention to be readily carried out, the length of the container 10 is about 18 in., the width 15 in., and the height 3 in. The plates have a length slightly less than 18 in., a width slightly less than 15 in. and a depth less than 3 in. to leave ⅛ of an inch before the knife edge reaches the bottom of the container. The top plate acts to limit the entry of the knife plates. Preferably, the length of a space is about 3 in. with a width of about 1½ inches.

The invention is intended particularly for Mozzarella cheese which has a rather unique plastic consistency, requiring considerable pressure of the plates to separate the original doughy plastic cheese into blocks or more or less rectangular shape.

The operation is as follows:

The curd is first cut or ground and put into a tub to be mixed ("mixing" is merely a term used; there is nothing mixed with the curd). Hot water is poured into the tub until it has covered the curd.

This "first" application of hot water removes the chill from the curd, then it is removed and more hot water is added. The second application should mix the batch of curd. If need be, a third change of water can be made.

The curd now comes to a soft melting stage and with the use of a paddle, is worked and stretched continuously until a mass of smooth texture is formed, similar to the molasses candy stretchers.

When the curd is sufficiently stretched and ready for shaping, it is placed into a pan or container. The curd settles squarely into the pan.

The next step is to apply the cutter. This former or cutter consists of a series of plates or blades as described.

This cutter or former is pressed into position of the pan and cuts out the sections. The pan, curd and cutter are then placed in a cold water vat and allowed to cool. After sufficient cooling, the cutter is removed and the contents is removed from the pan in the form of a "slab," because the cutter has cut all but approximately ⅛ of an inch of the plastic curd or cheese. That binds the partially separated pieces together.

This "slab" is placed in a salt brine for approximately one hour. When salted sufficiently, the "slab" is removed and allowed to become partly dry. The binding curd is then cut by suitable knives or by forcing the former therethrough and the individual cubes are separated measuring approximately 3" x 3" x 1½". Each cube is then wrapped in cellophane by a sealing machine, and is ready for merchandizing.

By the method described, and said means, Mozzarella cheese may be marketed and merchandized in small appetizing blocks, instead of the irregular or rounded shapes heretofore used.

I wish it to be understood that I do not desire to be limited to the exact details of construction shown and described, for obvious modifications will occur to a person skilled in the art.

I claim:

1. In Mozzarella cheese forming, the method which comprises cutting the curd in the presence of hot water, covering the cut curd with hot water and heating the cut curd to the soft melting stage, mixing the softened curd, paddling the mix until a mass of smooth texture is formed after continuous stretching of the mix, subjecting said mix to pressure to form a block, cooling said block, subjecting said cooled block to brine for a substantial period of time, partly drying said block from its temperature resulting from said hot water, and wrapping and sealing said block.

2. In Mozzarella cheese forming, the method which comprises cutting the curd in the presence of hot water, covering the cut curd with hot water and heating the cut curd to the soft melting stage, mixing the softened curd, paddling the mix until a mass of smooth texture is formed after continuous stretching of the mix, subjecting said mix to a cutting action to form spaced blocks in a slab, cooling said slab, subjecting said cooked slab to brine for a substantial period of time, partly drying said slab, and separating and wrapping said blocks.

3. In Mozzarella cheese forming, the method which comprises cutting the curd in the presence of hot water, covering the cut curd with hot water and heating the cut curd to the soft melting stage, mixing the softened curd, paddling the mix until a mass of smooth texture is formed after continuous stretching of the mix, subjecting said mix to a cutting action to form spaced blocks in a slab, holding the blocks by a membrane of cheese, cooling said slab, subjecting said cooled slab to brine for a substantial period of time, partly drying said slab from the temperature resulting from said hot water, cutting said membrane and wrapping said individual and separate blocks.

References Cited in the file of this patent

UNITED STATES PATENTS

| | | |
|---|---|---|
| 1,418,242 | Fieldman | May 30, 1922 |
| 1,728,778 | Alchin | Sept. 17, 1929 |
| 1,825,916 | Mock | Oct. 6, 1931 |
| 2,087,061 | Mabrey | July 13, 1937 |
| 2,193,462 | Miollis | Mar. 12, 1940 |
| 2,494,638 | Stine | Jan. 17, 1950 |

OTHER REFERENCES

Bulletin 608, revised Feburary 1932, of U. S. Dept. of Agriculture "Varieties of Cheese; Descriptions and Analyses," pages 21 and 22 "Gonda"; page 29 "Process" and page 33, "Mozzarinelli."